United States Patent
Hara

(10) Patent No.: US 8,281,073 B2
(45) Date of Patent: Oct. 2, 2012

(54) INFORMATION PROCESSING APPARATUS AND METHOD OF CONTROLLING SAME

(75) Inventor: Kenji Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 430 days.

(21) Appl. No.: 12/698,750

(22) Filed: Feb. 2, 2010

(65) Prior Publication Data

US 2010/0211743 A1 Aug. 19, 2010

(51) Int. Cl.
*G06F 12/08* (2006.01)

(52) U.S. Cl. .............. 711/119; 711/147; 711/E12.017

(58) Field of Classification Search .............. 711/119, 711/147
See application file for complete search history.

(56) References Cited

U.S. PATENT DOCUMENTS

| | | |
|---|---|---|
| 5,878,198 A | 3/1999 | Yuasa et al. |
| 6,510,495 B1 | 1/2003 | Nobukiyo |
| 7,016,065 B2 | 3/2006 | Hara |
| 2003/0056072 A1* | 3/2003 | Schmisseur et al. .......... 711/170 |
| 2003/0084245 A1* | 5/2003 | Tanaka et al. ................. 711/118 |
| 2004/0196485 A1 | 10/2004 | Hikichi et al. |
| 2007/0186059 A1* | 8/2007 | Miki ............................ 711/151 |

FOREIGN PATENT DOCUMENTS

| | | |
|---|---|---|
| JP | 7-244614 A | 9/1995 |
| JP | 2001-147855 A | 5/2001 |

* cited by examiner

*Primary Examiner* — Kenneth Lo

(74) *Attorney, Agent, or Firm* — Fitzpatrick, Cella, Harper & Scinto

(57) ABSTRACT

Disclosed is an information processing apparatus equipped with first and second CPUs, as well as a method of controlling this apparatus. When the first CPU launches an operating system for managing a virtual memory area that includes a first cache area for a device, the first CPU generates specification data, which indicates the corresponding relationship between the first cache and a second cache for the device and provided in a main memory, and transfers the specification data to the second CPU. In accordance with the specification data, the second CPU transfers data, which has been stored in the device, to a physical memory corresponding to a cache to which the first CPU refers. As a result, the first CPU accesses the first cache area is thereby capable of accessing the device at high speed.

7 Claims, 11 Drawing Sheets

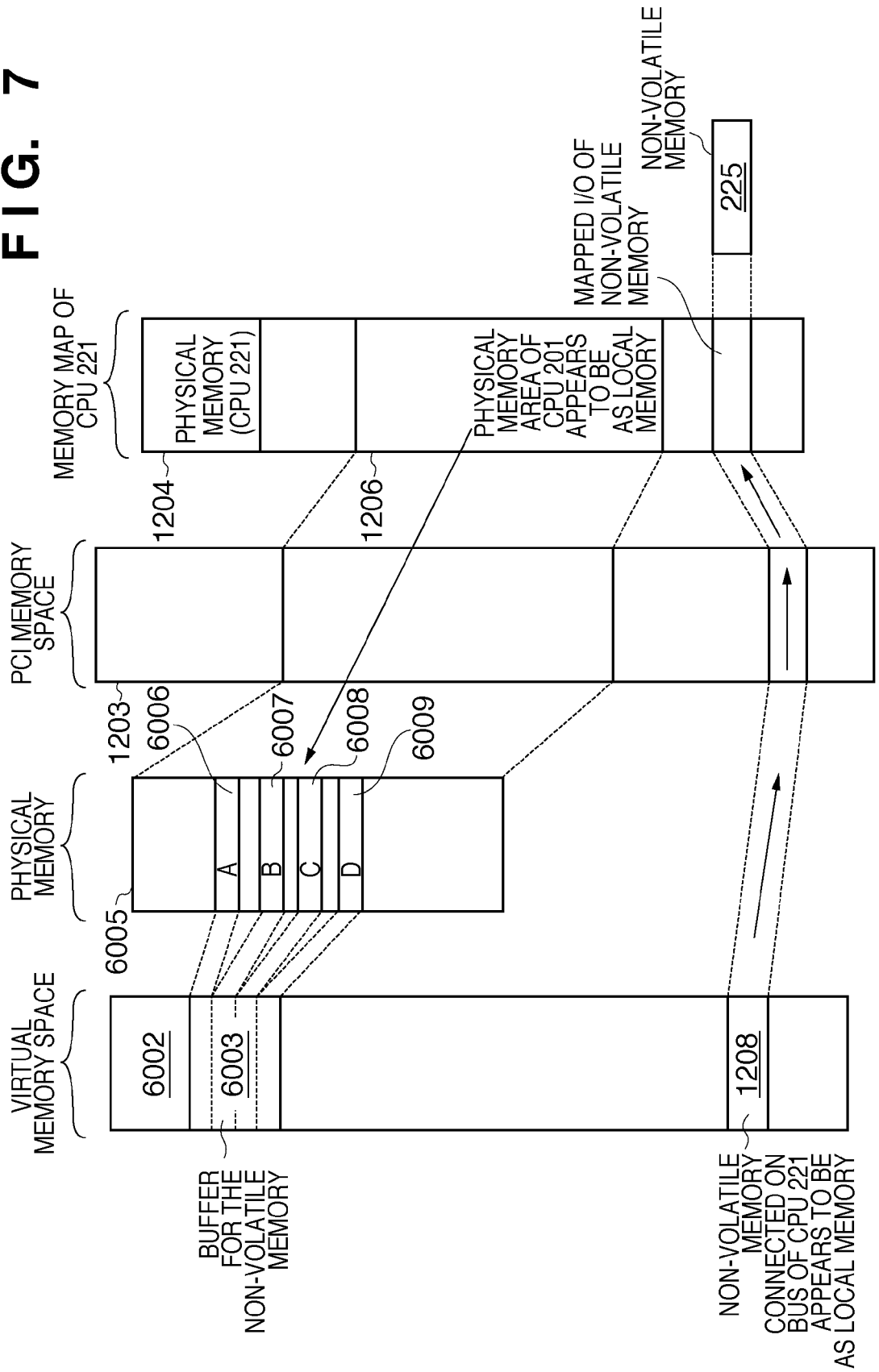

FIG. 8

| ADDRESS OF VIRTUAL MEMORY | ADDRESS OF PHYSICAL MEMORY | ADDRESS OF NON-VOLATILE MEMORY | SIZE |
|---|---|---|---|
| ADDRESS A OF BUFFER 6003 | ADDRESS A OF BUFFER 6006 | ADDRESS a OF NON-VOLATILE MEMORY 225 | SIZE OF BUFFER 6006 |
| ADDRESS B OF BUFFER 6003 | ADDRESS B OF BUFFER 6007 | ADDRESS b OF NON-VOLATILE MEMORY 225 | SIZE OF BUFFER 6007 |
| ADDRESS C OF BUFFER 6003 | ADDRESS C OF BUFFER 6008 | ADDRESS c OF NON-VOLATILE MEMORY 225 | SIZE OF BUFFER 6008 |
| ADDRESS D OF BUFFER 6003 | ADDRESS D OF BUFFER 6009 | ADDRESS d OF NON-VOLATILE MEMORY 225 | SIZE OF BUFFER 6009 |

800    801    802    803

INFORMATION PROCESSING APPARATUS AND METHOD OF CONTROLLING SAME

BACKGROUND OF THE INVENTION

1. Field of the Invention

The present invention relates to an information processing apparatus equipped with a plurality of CPUs and to a method of controlling this apparatus.

2. Description of the Related Art

A non-volatile memory typified by a flash memory is available as a memory device used in an information processing apparatus. Since a non-volatile memory is capable of retaining stored data even if the supply of electric power thereto is interrupted, such a memory is used to deal with an unexpected electric power interruption in built-in devices.

The specification of Japanese Patent Laid-Open No. 2001-147855 describes an invention in which a cache is applied in a main memory. Further, the specification of Japanese Patent Laid-Open No. 7-244614 describes a technique in which, in a unit having a buffer with a high access speed, a non-volatile memory with a low access speed and a controller, data that has been stored in the non-volatile memory having the low access speed is cached in the buffer having the high access speed, whereby the data that has been stored in the non-volatile memory can be read out at high speed.

However, in a case where an apparatus has first and second CPUs and is controlled by an operating system in which the first CPU manages a virtual memory area, the second CPU cannot access the virtual memory area directly. Consequently, in a case where the operating system executed by the first CPU uses the virtual memory area, a situation arises in which the second CPU cannot transfer data to the cache area defined by the first CPU.

SUMMARY OF THE INVENTION

An aspect of the present invention is to eliminate the above-mentioned problems with the conventional technology.

The present invention provides an information processing apparatus having a first control unit for executing an operating system that manages a virtual memory area and a second control unit capable of communicating with the first control unit, in which the first control unit is capable of accessing, at high speed, data that has been stored in a memory, which is not subject to management, of the virtual memory area managed by the operating system.

According to an aspect of the present invention, there is provided an information processing apparatus comprising:

a first storage unit configured to store data;

a second storage unit configured to store data;

a first control unit connected to the first storage unit via a first bus, configured to execute an operating system for managing a virtual memory area that includes a first cache area for the second storage unit, and to access the first cache area to acquire the data that has been stored in the second storage unit;

a second control unit connected to the second storage unit via a second bus, configured to communicate with the first control unit; and a generation unit configured to generate specification data, which indicates a corresponding relationship between the first cache area and a second cache area that is provided in the first storage unit for the second storage unit, when the operating system is launched;

wherein the first control unit responds to a request from the second control unit by transferring area information, which is indicative of the second cache area, to the second control unit; and the second control unit transfers the data, which has been stored in the second storage unit, to the second cache area based upon the area information.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram describing a memory space managed by a bus controller according to the embodiment;

FIG. 8 is a diagram illustrating an example of block specifications of a physical memory according to the embodiment;

DESCRIPTION OF THE EMBODIMENTS

Embodiments of the present invention will now be described in detail with reference to the accompanying drawings. It is to be understood that the following embodiments are not intended to limit the claims of the present invention and that not all of the combinations of the aspects that are described according to the following embodiments are necessarily required with respect to the means for solving the problems according to the present invention.

Figure 1:
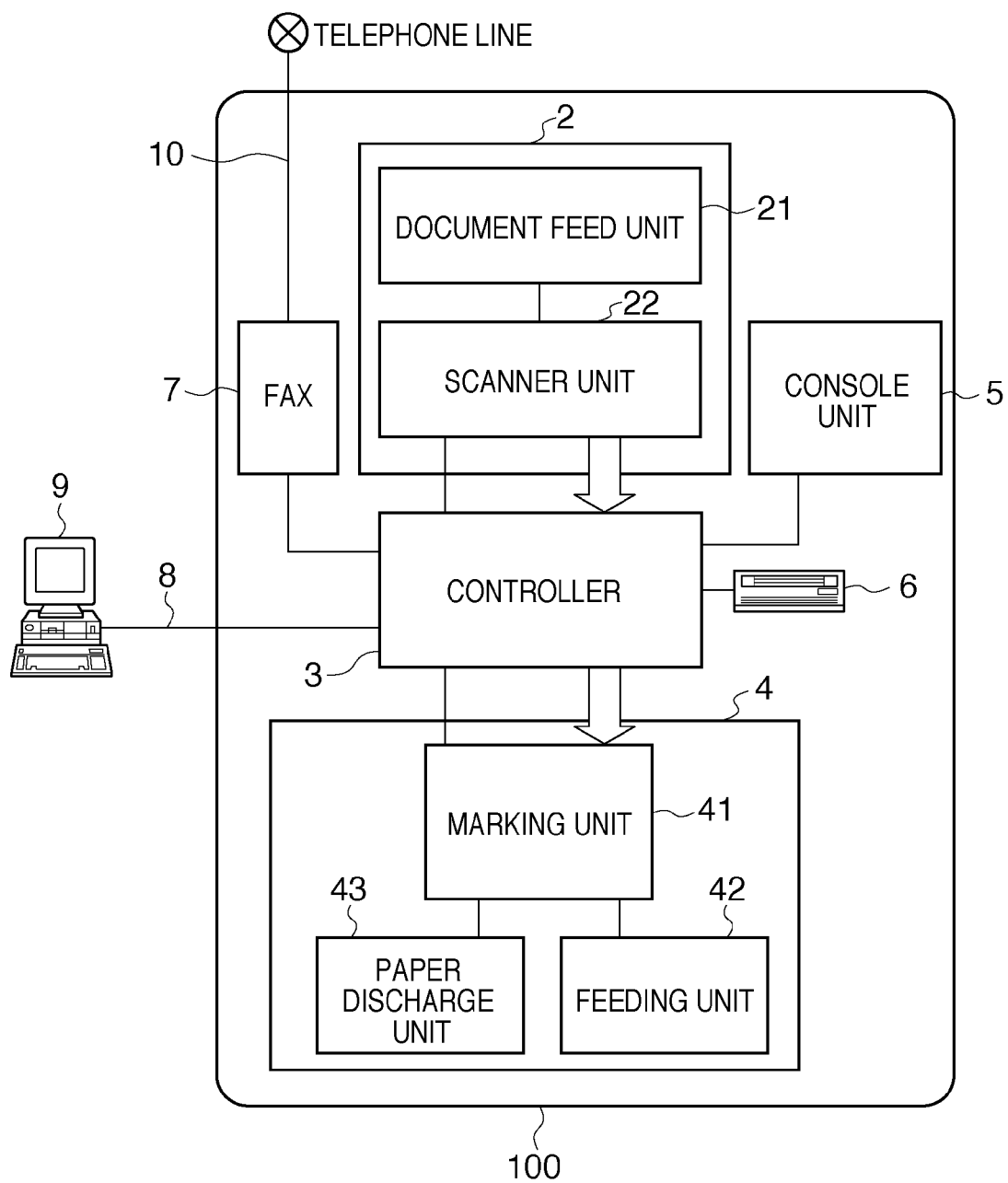
FIG. 1 is a block diagram describing the functional configuration of an image input/output apparatus equipped with a controller according to an embodiment of the present invention.

FIG. 1 is a block diagram describing the functional configuration of an image input/output apparatus (information processing apparatus) 100 equipped with a controller, according to an embodiment of the present invention. Although the image input/output apparatus 100 will be described for a case where it is a multifunction peripheral having a copy function, a facsimile function and a printer function, etc., the present invention is not limited to such a multifunction peripheral.

The image input/output apparatus 100 is connected to a host computer 9 via a LAN 8 such as Ethernet. The image input/output apparatus 100 includes a reader unit 2 for executing processing for reading an image to generate image data, a print unit 4 for executing processing for printing image data, a console unit 5, a storage unit (hard-disk drive) 6 and a controller 3 for controlling these units. The console unit 5 has a keyboard for designating of inputting and outputting operation of image data and inputting a user instructions, and a liquid crystal display panel for displaying and setting, etc., image data and various functions. The storage unit 6 stores image data that has been read in by controlling the reader unit 2, and image data that has been generated from code data received from the host computer 9 via the LAN 8. The controller 3 is connected to and controls each of these structural elements.

The reader unit 2 includes a document feed unit 21 for transporting an original document, and a scanner unit 22 for reading the original document optically and converting it to image data in the form of an electrical signal. A facsimile (FAX) unit 7 sends and receives a facsimile signal via a telephone line 10. The print unit 4 includes a feeding unit 42 having multiple tiers of paper cassettes for accommodating paper sheets; a marking unit 41 for transferring image data to a sheet and fixing the image on the sheet; and a paper discharge unit 43 for subjecting a printed sheet to sort processing and staple processing and then discharging the sheet to the exterior of the apparatus 100.

The controller 3 provides a copy function for controlling the reader unit 2 to thereby read in the image data from the original document and controlling the print unit 4 to thereby print the image data on a sheet. The controller 3 further includes a scanner function for converting image data, which has been read by the reader unit 2, to code data and transmitting the code data to the host computer 9 via the network 8. The controller 3 further includes a printer function for converting code data, which has been received from the host computer 9 via the network 8, to image data and outputting the image data to the print unit 4. The controller 3 has other function blocks as well.

The image input/output apparatus 100 constructed as described above primarily has a copy function, an image transmission function, an image storage function and an image print function. The copy function stores image data, which has entered from the reader unit 2, in the storage unit 6 and prints the image data by the print unit 4. The image transmission function transmits image data, which has entered from the reader unit 2, to the host computer 9 via the LAN 8. The image storage function stores image data, which has entered from the reader unit 2, in the storage unit 6 and transmits or prints the image data as necessary. The image print function analyzes page description language, for example, which has been sent from the host computer 9, and performs printing using the print unit 4.

Figure 2:
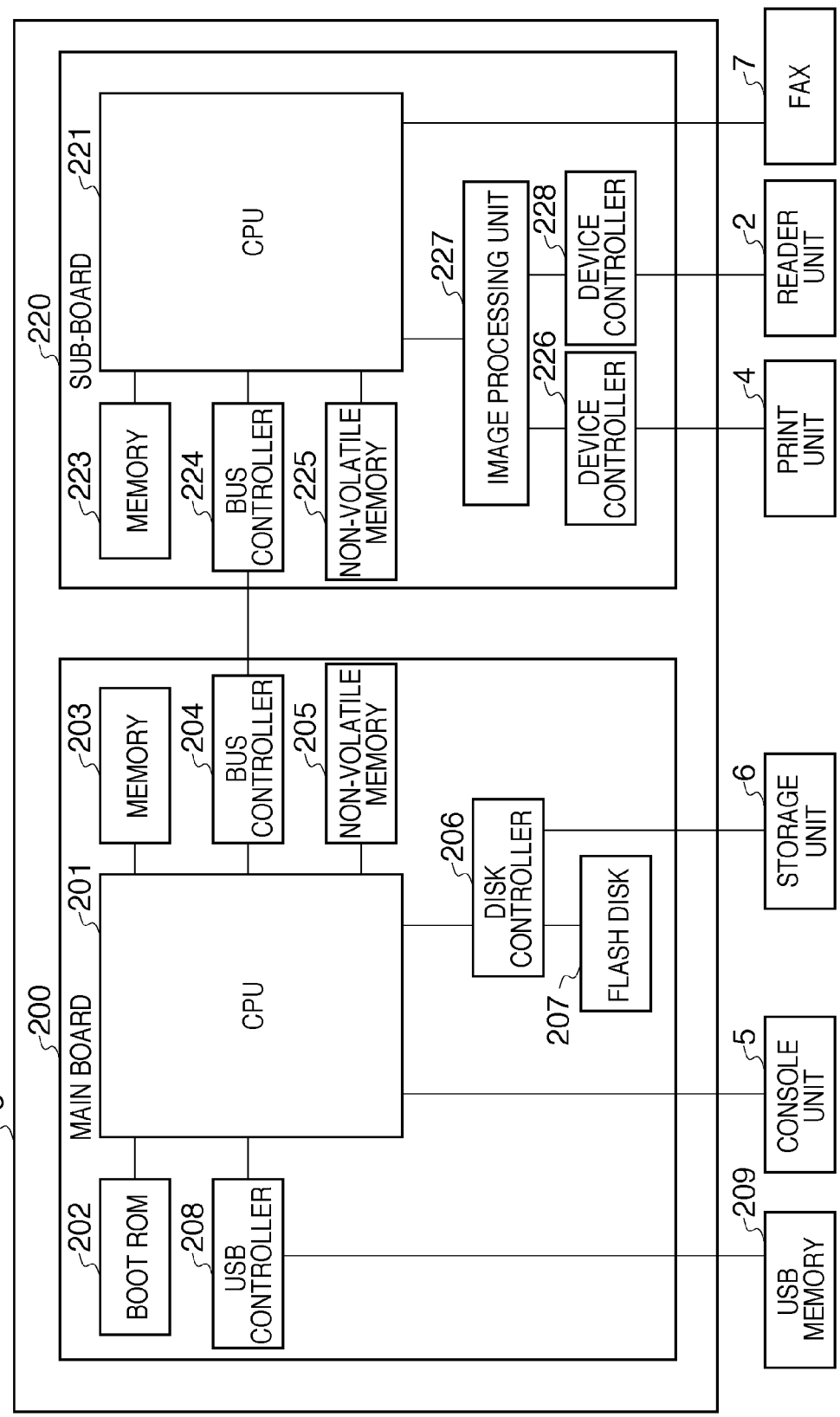
FIG. 2 is a block diagram useful in describing the hardware configuration of the controller in the image input/output apparatus according to the embodiment.

FIG. 2 is a block diagram describing the hardware configuration of the controller 3 in the image input/output apparatus 100 according to the embodiment. Components in FIG. 2 identical with those shown in FIG. 1 are designated by like reference characters.

The controller 3 includes a main board 200 and a sub-board 220. The main board 200 is a so-called general-purpose CPU system and has a main CPU 201 (first control unit) for controlling the overall board; a boot ROM 202 that includes a boot program; a memory 203 that stores a program to be executed by the CPU 201 and also is used as a work memory by the CPU 201; a bus controller 204 having an external-bus bridging function; a non-volatile memory 205 (which may be a memory backed up as by a battery); a disk controller 206 for controlling the storage unit 6; a flash disk [SSD (Solid-State Drive)] 207, which is a comparatively small-capacity storage device constituted by a semiconductor device; and a USB controller 208, etc., for controlling a USB memory 209. The main board 200 is connected to the USB memory 209, console unit 5 and storage unit 6.

The sub-board 220 is constituted by a comparatively small general-purpose CPU system and hardware for image processing. The sub-board 220 includes a CPU 221 (second control unit); a memory 223 that stores a program to be executed by the CPU 221 and also is used as a work memory by the CPU 221; a bus controller 224 having an external-bus bridging function; a non-volatile memory 225; an image processing unit 227 for executing digital image processing in real time; and device controllers 226, 228. The reader unit 2 and print unit 4 exchange digital image data with the image processing unit 227 via the device controllers 228, 226, respectively. The facsimile unit 7 controls the CPU 221 directly.

It should be noted that FIG. 2 is illustrated in abbreviated form. For example, although the CPUs 201, 221, etc., include a number of items of CPU peripheral hardware such as a memory controller, chipset, bus bridge, clock generator and DMAC, these are not described for the sake of brevity.

The operation of the controller 3 will now be described taking the copy function as an example.

When the user specifies copying from the console unit 5, the CPU 201 sends the reader unit 2 an image read-in instruction via the CPU 221. In response, the reader unit 2 optically scans in the original document, converts the document to digital image data and inputs the digital image data to the image processing unit 227 via the device controller 228. The image processing unit 227 stores the image data in the memory 223 by DMA.

When the CPU 201 confirms that a fixed amount or all of the digital image data has been stored in the memory 223, the CPU 201 instructs the print unit 4 to print via the CPU 221. The CPU 221 notifies the image processing unit 227 of the location of the image data in the memory 223. In accordance with a synchronizing signal from the print unit 4, the image data in the memory 223 is transmitted to the print unit 4 via the image processing unit 227 and device controller 226 and is printed on a sheet by the print unit 4.

In a case where multiple copies are to be printed, the CPU 201 stores the image data of memory 223 in the storage unit 6. From the second copy onward, therefore, the image data is read out of the storage unit 6 and output to the print unit 4, which proceeds to print the image data.

Figure 3:
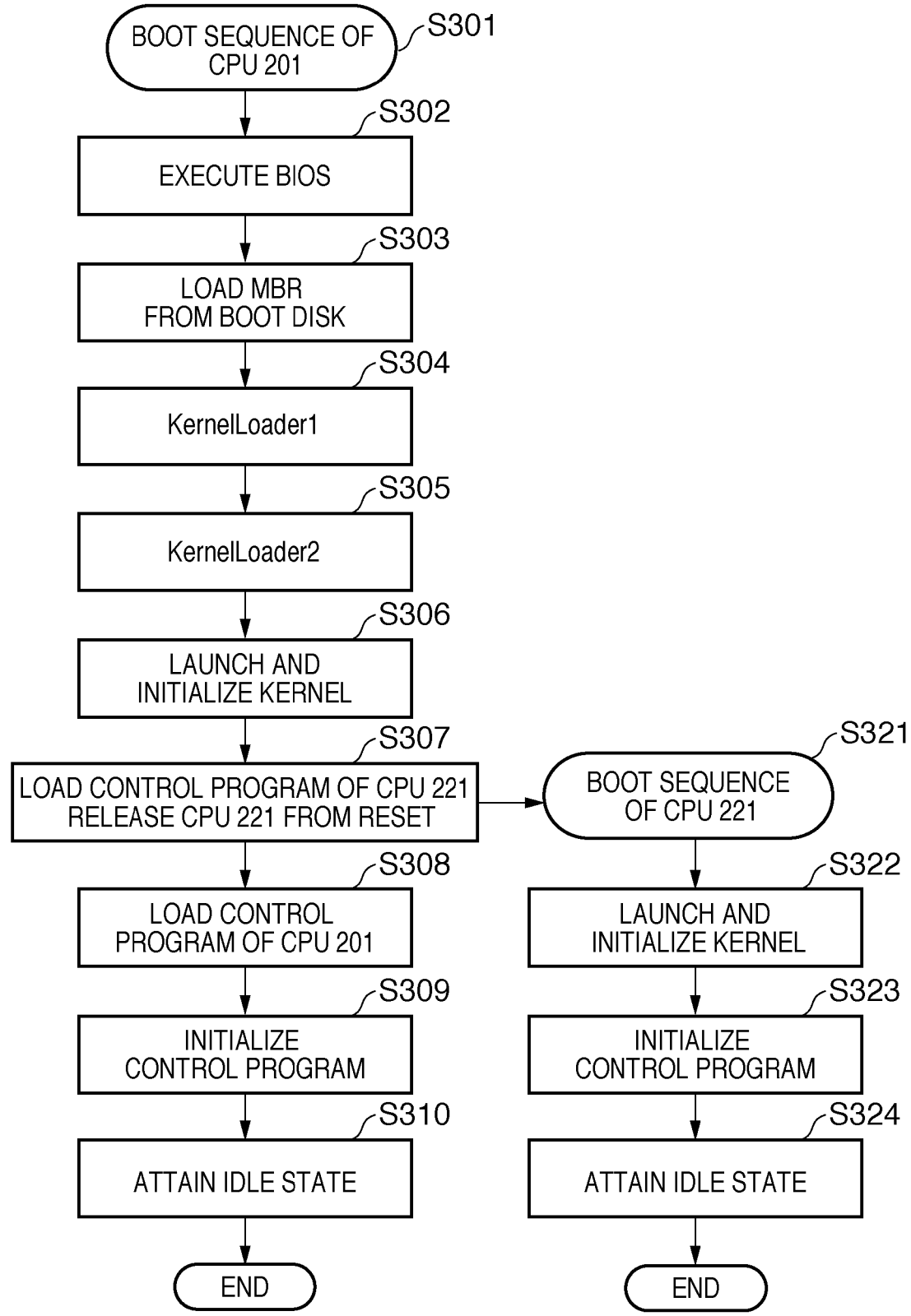
FIG. 3 is a flowchart describing the boot sequences of two CPUs of the image input/output apparatus according to the embodiment.

FIG. 3 is a flowchart describing the boot sequences of the two CPUs of the image input/output apparatus 100 according to the embodiment. The image input/output apparatus 100 according to the embodiment employs a multi-core system and therefore a boot sequence is executed by the control program of each CPU. The flowchart of FIG. 3 describes processing up to execution of a main-CPU control program 406 in FIG. 4 by the CPU 201 and up to execution of a sub-CPU control program 407 in FIG. 4 by the CPU 221. In general, a boot sequence in such a configuration equipped with a plurality of CPUs is such that each CPU possesses a boot ROM. If such an arrangement is adopted, however, it will be required that the same version of the control program be utilized among the plurality of CPUs. In addition, using two storage devices raises cost. Accordingly, in this embodiment, the sequence employed is one in which the master side (main board 200) is launched first and then the main board 200 launches the slave side (sub-board 220).

This processing begins in response to electric power being supplied to the main board 200. The electric power supply is turned on, a reset circuit operates and the peripheral IC of the CPU is initialized. When initialization is completed, the CPU 201 is released from the reset state and launches. As a result, the boot sequence of CPU 201 is started in step S301. Here the CPU 201 will be described on the assumption that it relies upon the ordinary X86 architecture. The boot device here is assumed to be the storage unit 6, which is a hard-disk drive.

Figure 4:
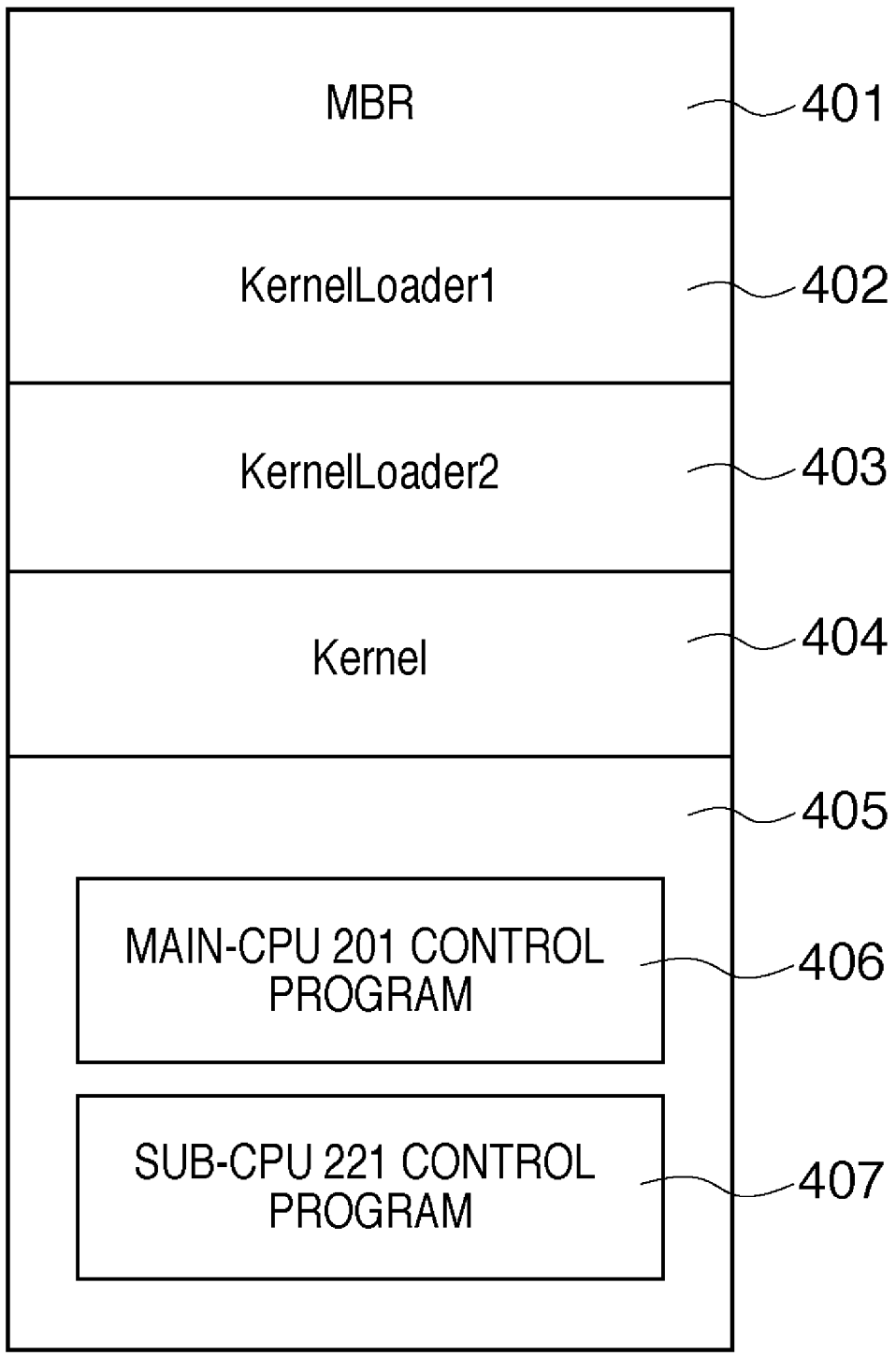
FIG. 4 is a diagram illustrating an image of data that has been stored in a storage unit of the image input/output apparatus according to the embodiment.

The organization of data in the storage unit 6 at this time is shown in FIG. 4.

Next, control proceeds to step S302, where the CPU 201 executes the program code of the boot ROM 202 (e.g., BIOS) upon occurrence of exceptional execution in a reset exception. The boot program sequentially initializes the peripheral devices such as the chipset of the CPU 201, reads in an MBR (Master Boot Record) 401 (FIG. 4) of the storage unit 6, which is the start-up disk, via the disk controller 206 and executes the MBR in step S303. A program capable of being described in the MBR 401 is very short and merely reads in a KernelLoader1 402 from the storage unit 6 and shifts to execution. Next, in step S304, control shifts to KernelLoader1 (402). The X86 architecture according to this embodiment possesses a Legacy Compatibility Mode and there are limitations in terms of memory access and CPU instruction execution. Accordingly, the minimum device initialization is performed and the mode of the CPU 201 operating in legacy compatibility is changed over to the latest mode in which a high performance will be achieved. In step S305, a KernelLoader2 403 is read in from the storage unit 6 and a jump takes place. Next, in step S306, the KernelLoader2 403 reads in kernel 404 from the storage unit 6 and control jumps to the execution routine of this kernel.

The processing thus far is a state prior to launching of the kernel. The storage device such as the storage unit 6 that is in the mainstream at the present time designates a logical address referred to as an "LBA" (Logical Block Addressing) and inputs/outputs data in sector units. However, since the programmer cannot perform management and control by designating a large quantity of addresses, the method adopted is one in which a "file" concept is created in terms of the kernel, LBA is obtained from the manipulation applied to this file and the prescribed data is accessed.

In general, it may be considered that access to a storage device is performed in its entirety via the file system of the kernel. Further, it may be construed that the application that runs on the kernel can only access a file system area 405 (FIG. 4) managed by the file system.

Further, in the disk controller 206, a standard interface such as one stipulated by, e.g., ATAPI (At Attachment Packet Interface) or SATA (Serial ATA) is defined and the flash disk 207 or storage unit 6 can be accessed without the CPU 201 being aware. Further, if, even in the case of an incompatible interface, the kernel launches, it is possible for this to be dealt with readily by software in such a manner that the interface becomes a common interface. If the kernel thus launches in step S306, it becomes possible for the CPU 201 to use the file system. In addition, the device driver for each device is installed at launching of the kernel. As a result, almost all of the devices that have been connected to the CPU 201 become accessible.

Next, control proceeds to step S307. Here the memory controller within the CPU 221 is set via the bus controller 204. As a result, the CPU 201 creates a state in which the memory 223 is capable of being accessed. Next, the CPU 201 loads the sub-CPU control program 407 (FIG. 4) of the CPU 221 from the storage unit 6 to the memory 223 via the file system.

Accordingly, the sub-CPU control program 407 of the CPU 221 comes to include the program from the reset exception of the CPU 221. When the CPU 201 releases the CPU 221 from reset, a reset exception occurs in the CPU 221 and the program is executed from the reset vector. Description of launching of the CPU 221 will be given later.

Next, control proceeds to step S308, where the CPU 201 loads the main-CPU control program 406 from the storage unit 6 to the memory 203 and jumps to this program. Next, in step S309, control shifts to this control program, initialization of the application is performed and an idle state is attained in step S310.

Next, processing by the CPU 221 which starts in step S321 upon release from reset will be described. In such an apparatus equipped with two independent CPUs, generally a small scale real-time system is assumed. Unlike a special boot sequence possessed in order that X.86 will maintain backward compatibility, an ordinary CPU for built-in use possesses a very simple launch sequence.

First, in step S322, the CPU 221 executes the program of the reset vector. With the reset vector, initialization of the minimum hardware is performed and control jumps to the address of the kernel. If launching of the kernel is thus completed, control proceeds to step S323, where the sub-CPU control program 407 is initialized. The idle state is attained in step S324.

Thus, as described above, it becomes possible for the two CPUs 201 and 221 to run respective control programs that differ from each other, whereupon the controller 3 is launched.

Figure 5:
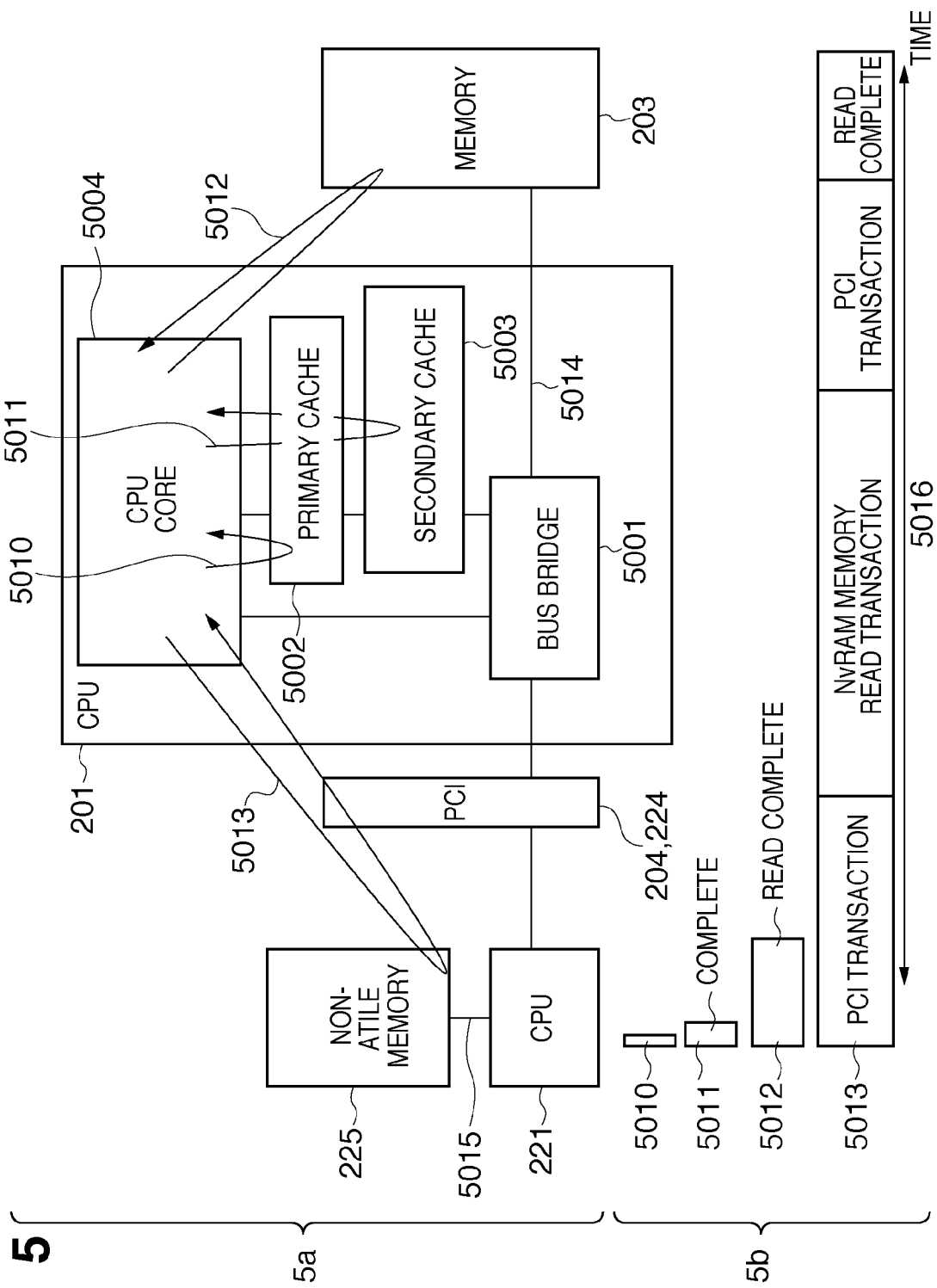
FIG. 5 is a diagram describing the memory access speed of a main CPU of the image input/output apparatus according to the embodiment.

FIG. 5 is a diagram describing the memory access speed of the main CPU 201 of the image input/output apparatus 100 according to this embodiment.

CPU performance has improved year by year and there are now CPUs in which the clock in the CPU core has a frequency ten or more times that of the main-memory bus. This indicates that if the device operates relying only on the cache within the CPU without accessing the main memory, then operation is possible at a speed that is approximately ten times greater. Accordingly, each CPU is equipped with many caches to improve the processing capability of the CPUs.

Further, it is required that the program be executed sequentially. Therefore, at the time of data access of the main memory, which is slow in comparison with the CPU cache, other neighboring instructions are executed in parallel with the memory access, even during access to the slow main memory, by execution pipeline within the CPU. This raises the processing capability of the CPU. Design optimized so as to thus cover for the slowness of the main memory is implemented by the chipset and CPU.

On the other hand, a general-purpose bus typified by a PCI bus, for example, exists, and by using bus expansion, a CPU becomes capable of accessing various devices. However, the speed of such buses is so slow as to be no comparison with the speed of the main memory. Regardless of the fact that the overall processing capability of the CPU is improved by optimizing the bus to the main memory, phenomena that cannot be absorbed by the pipeline of the CPU occur as a result of the CPU accessing a slow device on an expanded bus. The CPU stalls in this case and becomes incapable of performing any operation. With a device having a built-in CPU, there are instances where a specific device is connected on an expanded bus. If the CPU accesses the expanded bus frequently in this case, there are instances where even 1% of CPU capability cannot be used.

The invention will now be described with reference to the block diagram of FIG. 2 and the diagram of FIG. 5.

The CPU 201 in section 5a of FIG. 5 is internally provided with a CPU core 5004, a primary cache 5002, a secondary cache 5003 and a bus bridge 5001. The CPU 201 is connected to the memory 203 via a system bus (first bus) 5014. When it becomes necessary for the CPU core 5004 to read in data by bus access, access patterns of the kind approximately indicated at 5010 to 5013 are conceivable. In section 5b of FIG. 5, read-in time for each access is indicated by a graph.

The fastest access is indicated at 5010, which illustrates a case where data exists in the primary cache 5002. The next fastest access is indicated at 5011, which illustrates a case where data exists in the secondary cache 5003. The greater density of semiconductor processes in recent years has been accompanied by an increase in the capacity of secondary caches of from 4 KB to 6 MB. Bus access to memory 203, which is the main memory, is indicated at 5012. This is access in a case where there was no hit in the cache within the CPU 201. In this case, operation is not possible at a speed commensurate with the clock of the CPU core 5004. Since operation takes place in accordance with the clock of the memory bus, processing speed declines. Strictly speaking, after there is a burst read from the memory 203 to the primary cache 5002 and secondary cache 5003, the CPU 201 refers to these.

This embodiment deals with slow access via an external bus indicated at 5013 in FIG. 5. Described in this embodiment will be a method of dealing with a case where the CPU 201 accesses a storage device having a slow operating speed, such as the non-volatile memory 225, through the intermediary of the bus bridge (mounted in the CPU 221 in this embodiment) of the CPU 221 via a PCI bus. The slow access indicated at 5013 indicates a path on which the CPU 201 reads in data from the non-volatile memory 225 via a bus bridge of the CPU 221, a PCI bus (204/224) and the bus bridge 5001. It should be noted that the CPU 221 is connected to the non-volatile memory 225 via a system bus (second bus) 5015.

In a case where the reading of data indicated at 5012 is successive, the CPU core 5004 stalls to some degree to wait for the reading of the memory 203, although this depends upon the clock of the CPU 201 and the configuration of the pipeline. By contrast, the external bus access indicated at 5013 requires a read-in time incomparable with access in the core and on the local bus as indicated at 5010 to 5013. Accordingly, regardless of how large the pipeline of the CPU 201 is made, if instructions for memory read and memory write regarding the same address via the external bus are successive, the next write process cannot be executed as long as the reading of the data is not completed. As a consequence, it is believed that the pipeline locks and that the CPU 201 stalls for a period of time substantially equivalent to the access time indicated at 5016 in FIG. 5.

Accordingly, even if a high-performance CPU is employed, the result will be that CPU access by bus access to a device connected to such a slow bus will lower the average processing capability of the CPU greatly in a multi-task, multi-process environment.

A method of solving this problem will be described below.

This embodiment will be described for a case where a non-volatile memory is utilized as the slow device, taking an image input/output apparatus such as a multifunction peripheral as an example.

In FIG. 2, it is assumed that the CPU 201 is a high-performance CPU and that the system thereof is one in which a kernel that supports, e.g., a Linux™ or other virtual memory is caused to operate, and that the system of the CPU 221 is one in which an RTOS (Real-Time Operating System) or other kernel is caused to operate and is specialized in real time. Since the CPU 201 is a high-performance CPU, it can access the memory 203 at high speed. However, since it is necessary to access the non-volatile memory 225 via the bus controllers 204, 224 and the bus bridge that is within the CPU 221, the non-volatile memory 225 will be a sufficiently slow device as far as the CPU 201 is concerted.

Figure 6:
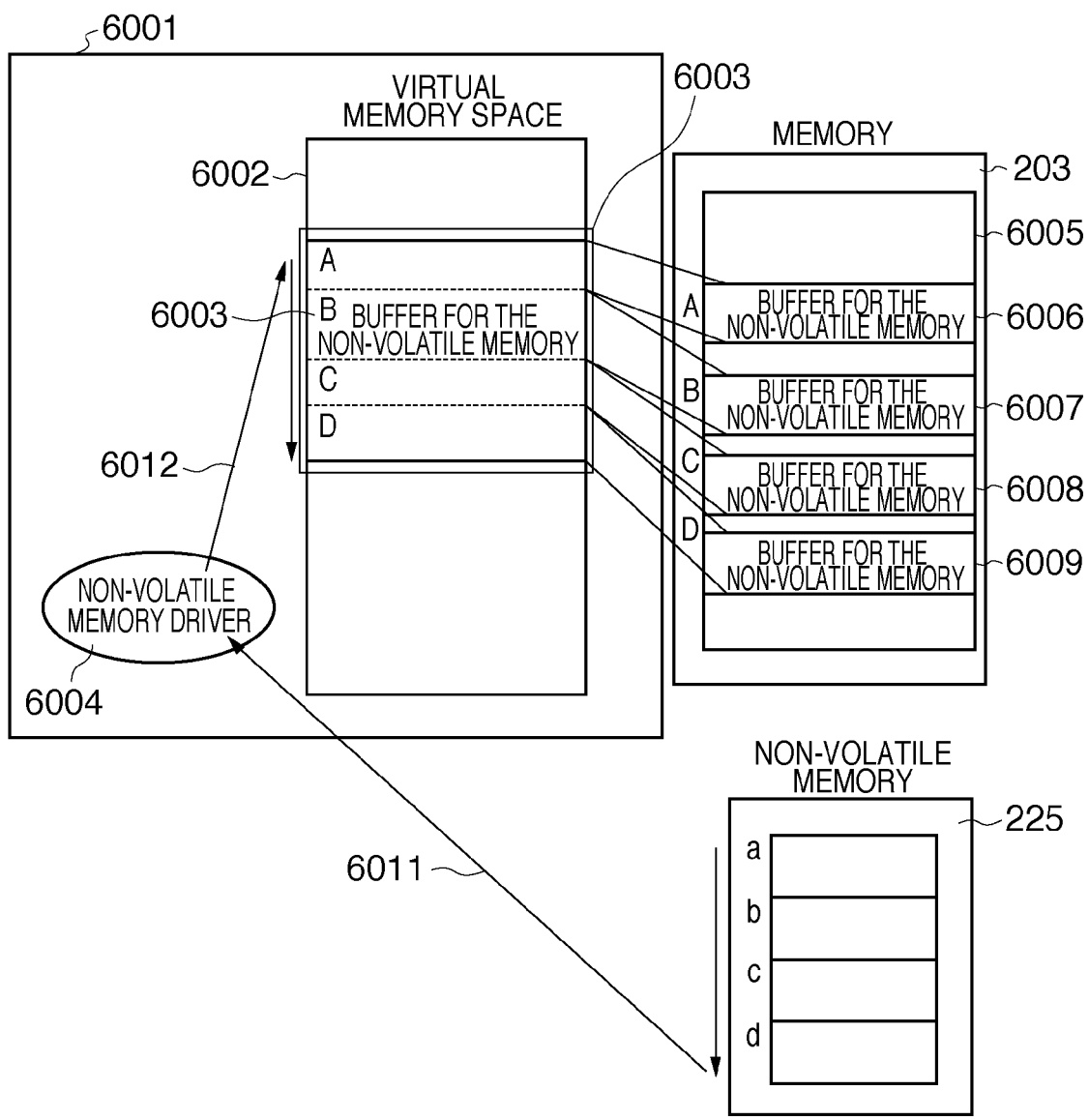
FIG. 6 is a diagram describing a method whereby a main CPU according to the embodiment handles a non-volatile memory.

FIG. 6 is a diagram describing a method whereby the main CPU 201 according to the embodiment handles the non-volatile memory 225.

A software image of the CPU 201 is indicated at 6001 in FIG. 6. The memory 203 is the main memory of the CPU 201. Indicated at 6002 is a virtual memory space (area) of the CPU 201. The operating system that supports the virtual memory is constructed in software fashion on the hardware of the CPU 201. The technology that uses the virtual memory space 6002 is technology that operates in such a manner that much more memory than the area of the physical memory 203 is mounted virtually. At such time the data of the memory area that is actually necessary is stored in the physical memory and the data of an area that is unnecessary is saved in the storage unit 6, etc. As a result, the arrangement is such that memory greater than the memory actually mounted with respect to the software is serviced. The kernel divides up and manages the physical memory in page units of, e.g., 4 KB and, by utilizing an MMU (Memory Management Unit), which is a function of the CPU 201, uses the necessary physical memory again by pasting it in the virtual memory space in page units. As a result, the memory addresses of the virtual memory space 6002 and the addresses of physical memory space will no longer coincide. Usually, however, the arrangement is such that the software need not be aware of this.

The non-volatile memory 225 usually has a slow access speed. Ordinarily, therefore, with regard to a device having such a slow access speed, a buffer for storing the data that is exchanged with this device is provided at a location near the CPU 201. This makes necessary a non-volatile memory driver 6004 for managing the buffer. The non-volatile memory driver 6004 issues, e.g., malloc ( ) or other system call to the kernel and requests the memory 203 for a buffer for the non-volatile memory. As a result, the kernel creates a buffer 6003 for the non-volatile memory in the virtual memory space 6002 and returns an address pointer of the buffer 6003. The non-volatile memory driver 6004 loads data from the non-volatile memory 225 via a route 6011 and copies the data to the buffer 6003 for the non-volatile memory via a route 6012. As a result, since the data of the non-volatile memory 225 has been stored in the buffer 6003 for the non-volatile memory, it will suffice to respond to a read request of the non-volatile memory 225 by reading the data that has been cached in the buffer 6003 for the non-volatile memory. Further, in a case where a request to write data to the non-volatile memory 225 has been issued, it will suffice to update the data of the buffer for the non-volatile memory and then transfer this updated data to the non-volatile memory 225. These are ordinary cache techniques. Usually such a cache system is constructed for slow devices and prevents CPU stall.

This embodiment is directed toward CPU access, which is indicated by route 6011, performed by the non-volatile memory driver 6004, and the object is to improve upon stalling of access of CPU 201 to the non-volatile memory 225. A solution is as follows: Since efficiency declines markedly when the CPU 201 accesses the non-volatile memory 225, it is considered that the non-volatile memory 225 should be accessed by another device. Generally, a DMAC is used for this purpose. A storage device such as a hard-disk drive is equipped with a high-speed DMAC. The DMAC transfers data between the slow-speed device and the memory 203 while competing with the CPU for bus privilege. Stalling of the CPU 201 will not occur at such time. (Strictly speaking, there are instances where some memory standby occurs if the memory bus is busy).

With the arrangement of FIG. 2 having the two CPUs 201, 221, a proxy data transfer by the CPU 221 is conceivable. However, in a case where the CPU 201 is supporting the virtual memory space 6002, the kernel manages page allocation of the virtual memory space 6002 which the kernel constructs in the software space of the CPU 201 indicated at 6001. As a consequence, the virtual memory space 6002 cannot be accessed from another system. In other words, since the CPU 221 cannot access the virtual memory space 6002, the CPU 221 cannot perform a proxy data transfer with respect to the buffer 6003 for the non-volatile memory.

On the other hand, the CPU 221 is capable of directly accessing the non-volatile memory 225 and can access the memory 203 via the bus controllers 204, 224.

FIG. 7 is a diagram for describing memory space managed by a bus controller according to this embodiment.

The virtual memory space 6002 is virtual memory space managed by the kernel of the operating system executed by the CPU 201. The memory space of memory 203 is indicated at 6005. The virtual memory space 6002 includes physical memory spaces [6006 to 6009 (see FIG. 6)] of the memory 203. Further, memory space in the bus controllers 204, 224 is indicated at 1203. In this embodiment, an ordinary PCI bus is described as an example of a general-purpose bus. Memory space of the CPU 221 is indicated at 1204. The PCI memory space 1203 is capable of creating a plurality of windows for every application by being set, and each CPU is capable of accessing a different bus system via the windows. For example, an area 1206 that has been mapped to the memory space 1204 is capable of accessing the physical memory space 6005 via the memory space 1203 of the bus controllers 204, 224. Similarly, the CPU 201 is capable of accessing the non-volatile memory 225 via an area 1208, which has been connected to the bus system of the CPU 221, as if the non-volatile memory 225 is connected via the local bus. If the path is long, however, bus standby will occur.

Thus, although the CPU 221 cannot access the virtual memory space 6002, the CPU 221 can access the physical memory space 6005. This feature is utilized in this embodiment.

A general method of assuring contiguous areas in a virtual memory space is to use malloc ( )

Although control differs depending upon the type of kernel, in the case of the ordinary Linux™ system, for example, an area is just created in the virtual memory space at the time of execution of kernel malloc( ). When an access is actually occurred, the physical space usable at this time is allocated dynamically and is associated in a state initialized to zero. Once associated, the physical memory must hold this value, as long as it is not freed (free( ) function), and therefore the physical memory exists in the physical memory space. However, in a case where frequency of use of the physical memory is low or in a case where the physical memory becomes unnecessary owing to other processing, it is swapped out and saved temporarily in an external storage device. In a case where an access to the virtual memory space occurs again in the state in which the physical memory is saved in the external storage device, a page exception is issued, available physical memory is searched for by page exception processing, the secured new physical memory is reconstructed from the external memory device and this physical memory is connected to the virtual memory. By such a virtual memory configuration, the user process accesses the same virtual memory area at all times, whereby it becomes possible to access one's own data in this area at all times.

The description will continue again with reference to FIG. 6.

Successive memory blocks of the virtual memory space 6002 are reserved as the divided blocks of buffers 6006 to 6009 of physical memory space 6005 by paging performed by the kernel. The relationship between the virtual memory space 6002 and the memory blocks of the physical memory space 6005 can be ascertained by utilizing system call of the kernel. Data can be excluded from the target of swapping by issuing a system call. In a case where such exclusion from swapping is performed, the virtual memory space 6002 and the buffers 6006 to 6009 of the physical memory space 6005 become associated universally as long as the kernel is not launched again.

This embodiment is characterized in that the CPU 221 having a different kernel connected to another bus transfers data in place of the high-speed CPU 201. If the CPU 221 has been connected to the memory 203 via the bus, the CPU 221 can access the physical memory space of the memory 203. However, with a kernel that uses a virtual memory system, the placement of data of the physical memory corresponding to the virtual memory space differs every time the system is launched, as mentioned above. As a consequence, the CPU 221 cannot be substituted and act as a substitute in transmitting data to the physical memory space 6005 that corresponds to the virtual memory space 6002.

In this embodiment, block specifications of physical memory are created by information that correlates areas A, B, C, D (first cache area) of the buffer 6003 for the non-volatile memory of the virtual memory space 6002 and buffers 6006 to 6009 (second cache area) of the physical memory space 6005.

FIG. 8 is a diagram describing an example of block specifications of a physical memory according to this embodiment.

Shown in FIG. 8 are virtual memory addresses 800, which are items of information concerning areas A, B, C, D of buffer 6003 for the non-volatile memory; addresses 801 of the buffers 6006, 6007, 6008, 6009 of physical memory 203 corresponding to areas A, B, C, D; address 802 (addresses a, b, c, d) of each of the recording areas (blocks) of non-volatile memory 225 corresponding to buffers 6006, 6007, 6008, 6009; and sizes (memory capacities) 803 of the buffers 6006, 6007, 6008, 6009. These items of information constitute specification data, which the non-volatile memory driver 6004 is capable of creating by acquiring kernel information, and are generated immediately after the buffer 6003 for the non-volatile memory is acquired.

On the basis of the block specifications of the physical memory, the CPU 221 is capable of accessing the buffers 6006 to 6009 of memory 203 by the bus access described earlier. As a result, access to the non-volatile memory 225 by the route 6011 shown in FIG. 6 can be eliminated and it becomes possible for the high-speed CPU 201 to be used efficiently.

Figure 9:
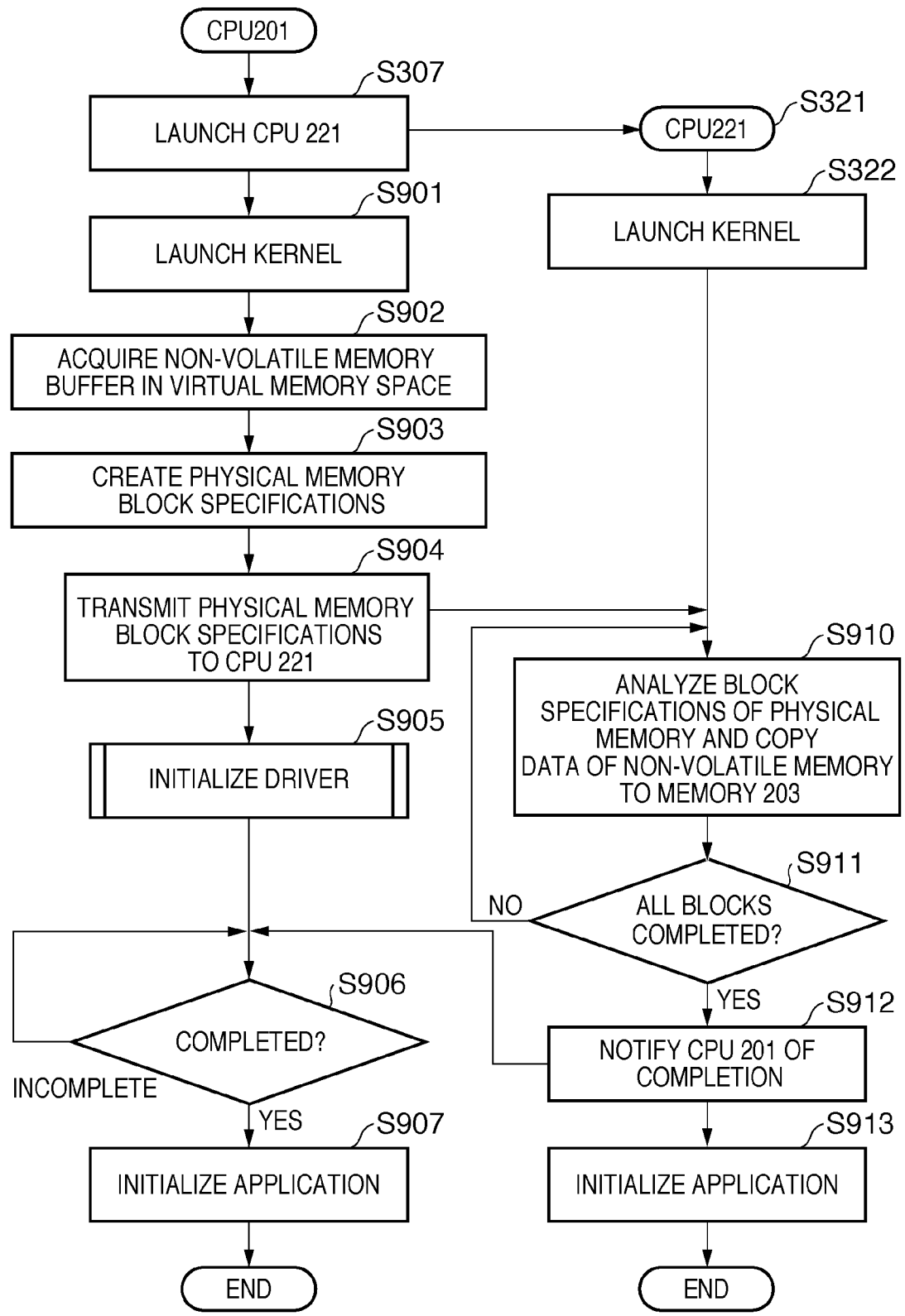
FIG. 9 is a flowchart describing boot processing by two CPUs of the image input/output apparatus according to the embodiment.

FIG. 9 is a flowchart describing boot processing by the two CPUs 201, 221 of the image input/output apparatus 100 according to the embodiment. Steps in FIG. 9 identical with those shown in FIG. 3 are designated by like step numbers.

In step S307 mentioned earlier, the CPU 201 launches the CPU 221, after which control proceeds to step S901. In step S901, the CPU 201 launches the kernel of the operating system. In response, the CPU 221 initializes the kernel of the operating system in step S322. Process of the CPU 221 then proceeds to step S910, in which the CPU 221 waits for receipt of the specification data of the physical memory block specified from the CPU 201.

Meanwhile, process of the CPU 201 proceeds from step S901 to step S902 and acquires the buffer 6003 for the non-volatile memory in the virtual memory space 6002. At this time the CPU 201 acquires a real memory area in the physical memory space 6005 of the memory 203 and locks this area. Thus, it is so arranged that the real memory area is not utilized until the area is unlocked (released). Next, in step S903, the CPU 201 generates the specification data of the physical memory block of the kind shown in FIG. 8. Next, in step S904, the CPU 201 transfers the specification data of the physical memory block to the CPU 221. Process then proceeds to step S905, in which the CPU 201 initializes the device driver.

As a result, in step S910, the CPU 221 analyzes the specification data of the physical memory block received from the CPU 201. The contents of each block of the non-volatile memory 225 are copied to the buffers (6006 to 6009) of the memory 203 in accordance with the specification data. In step S911, the CPU 221 copies all of the blocks a to d (FIG. 6) of non-volatile memory 225 to the buffers 6006 to 6009 of memory 203, whereupon process proceeds to step S912. Here the CPU 221 notifies the CPU 201 of the fact that the copying of the data of non-volatile memory 225 has been completed. Process of the CPUB 221 then proceeds to step S913, where the CPU 221 executes initialization of the application and then attains the idle state. In other words, execution of the application begins in a case where launching of the kernel of the operating system is completed and all of the blocks a to d of the non-volatile memory 225 have been copied to the buffers 6006 to 6009 of memory 203.

As a result, when the CPU 201 receives notification of completion of processing from the CPU 221 in step S906, process of the CPU 201 proceeds to step S907 and the CPU 201 initializes the application and attains the idle state. Accordingly, the CPU 201 can access the non-volatile memory 225 in the virtual memory space 6002 and therefore can access the non-volatile memory 225 at high speed.

Next, processing when the content of non-volatile memory 225 is changed in the embodiment will be described.

In the description rendered above, an example is described in which the buffers 6006 to 6009 (corresponding to the buffer 6003) for the non-volatile memory are created in the physical memory space 6002 of memory 203 because of the non-volatile memory 225 having the slow access speed. In this case, it will suffice to refer to the cache (the buffers for the non-volatile memory) with regard to reading of data from the non-volatile memory 225. However, in a case where a write event (a synchronizing event) for writing data to the non-volatile memory 225 occurs, it is necessary to rewrite the data of the buffer 6003 for the non-volatile memory and to rewrite the non-volatile memory 225 as well. In this case, various methods are conceivable, as by execution block by block or execution at a fixed time interval, by way of example.

Figure 10:
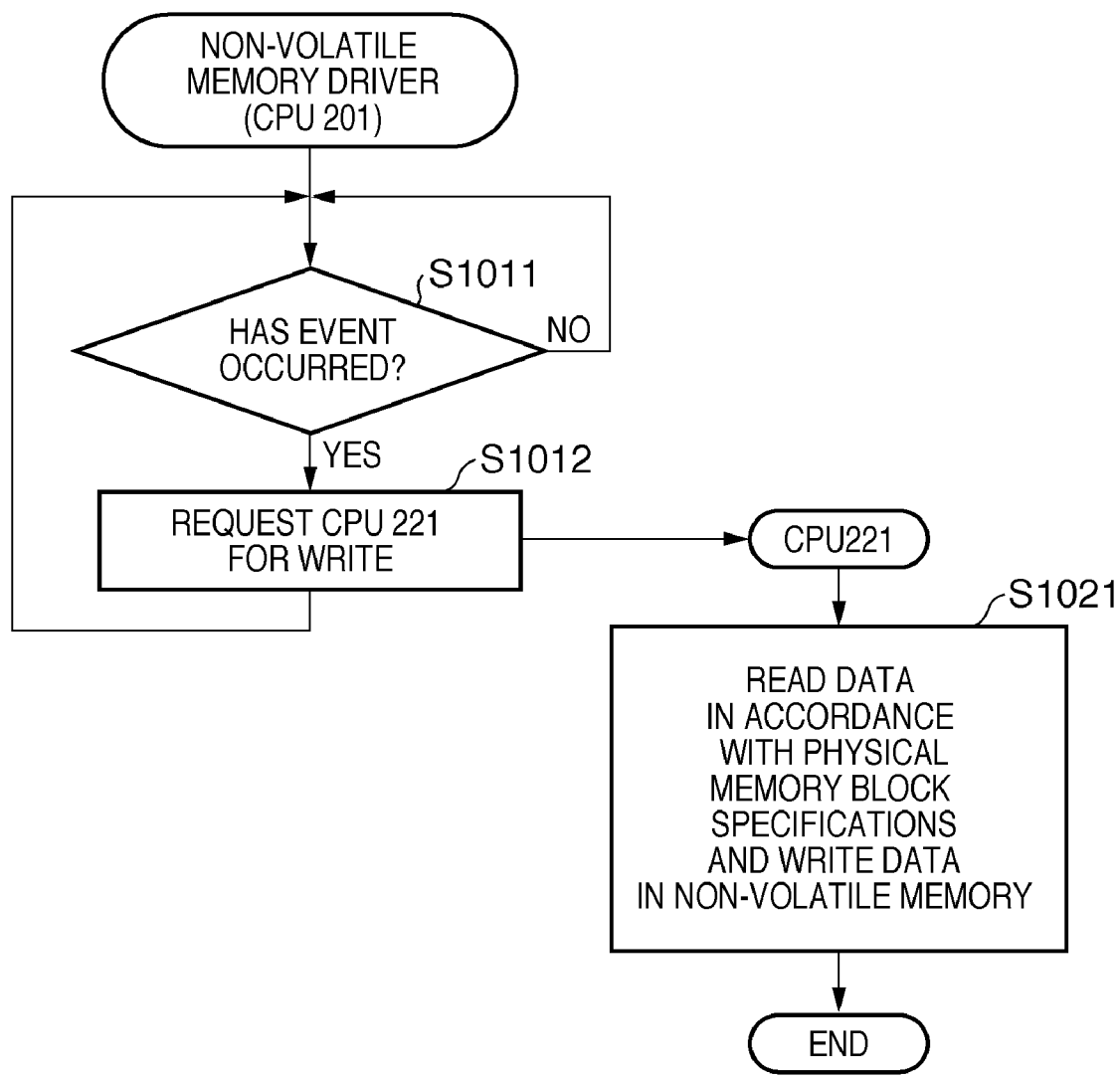
FIG. 10 is a flowchart describing processing for rewriting a non-volatile memory by two CPUs of the image input/output apparatus according to the embodiment.

FIG. 10 is a flowchart describing processing for rewriting the non-volatile memory 225 by the two CPUs of the image input/output apparatus 100 according to the embodiment.

First, in step S1011, the CPU 201 waits for occurrence of a data-write event to the non-volatile memory 225. When the event occurs, control proceeds to step S1012. Here the CPU 201 writes data to the corresponding buffer of the memory 203, notifies the CPU 221 of the above-mentioned specification data of the physical memory and requests the CPU 221 to update the non-volatile memory 225 with the data. It should be noted that before the CPU 221 is notified of the specification data, it is necessary to so arrange it that the buffers 6006 to 6009 of the memory 203 are locked and will not be reused by the kernel. It should be noted that operation may proceed with the buffers locked or that the buffers may be locked only during the time that the transfer is being requested of the CPU 221. As a result, control proceeds to step S1021, the CPU 221 reads out the data of the memory 203 based upon the specification data of the physical memory block sent by the CPU 201 and writes the data to the non-volatile memory 225.

Figure 11:
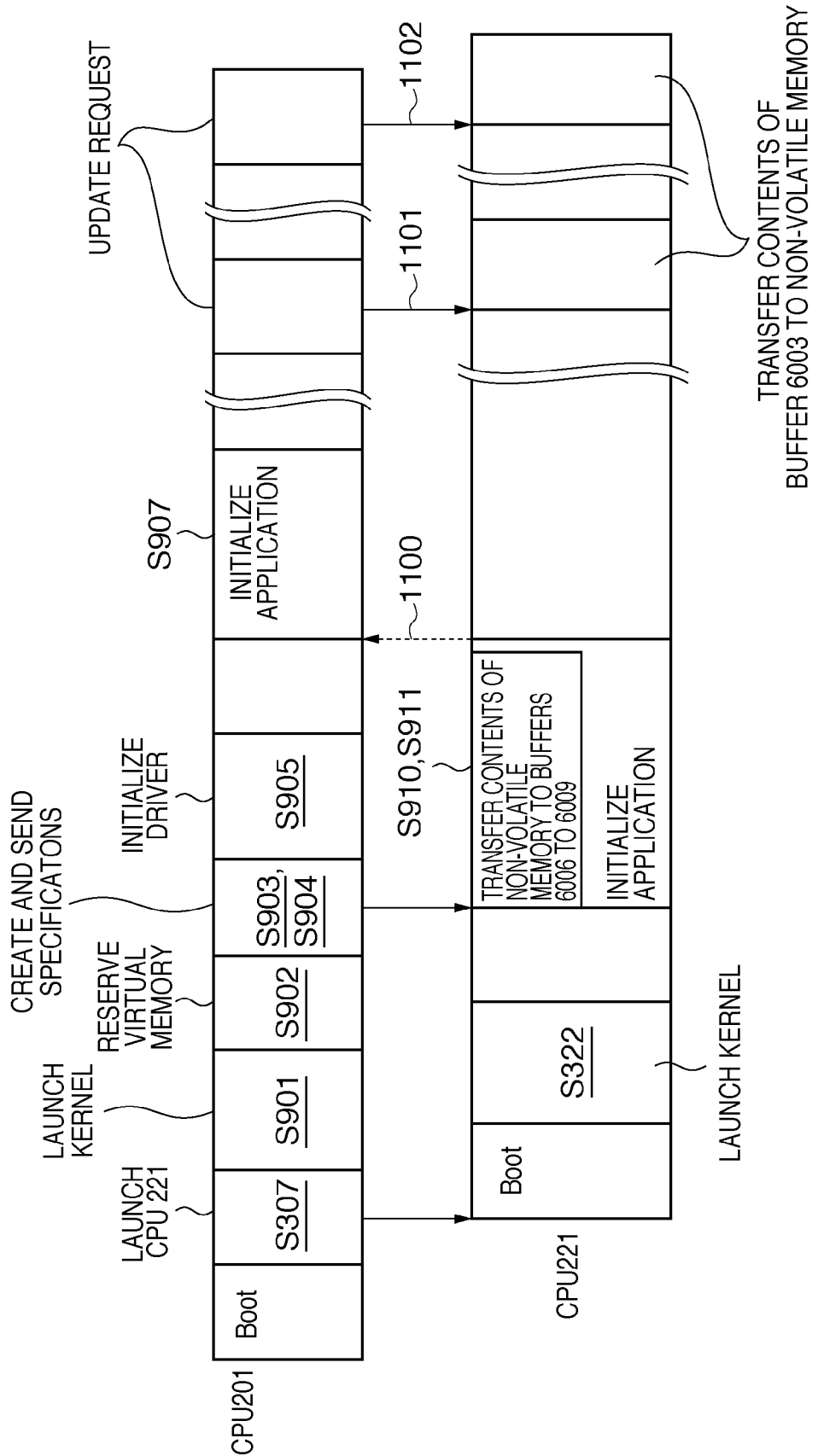
FIG. 11 is a timing chart for describing the operation of two CPUs according to the embodiment.

FIG. 11 is a timing chart for describing the operation of the two CPUs according to the embodiment. Steps in FIG. 11 identical with those shown in the flowchart of FIG. 9 are designated by like step numbers.

As illustrated in FIG. 11, the CPU 221 receives specification data from the CPU 201, whereupon the CPU 221 transfers the contents of non-volatile memory 225 to and stores the contents in the memory 203 in block units (S910, S911). As a result, the CPU 201 is capable of accessing the non-volatile memory 225 in virtual memory space 6002 by processing from a timing 1100 onward in FIG. 11. Reference numerals 1101, 1102 denote a case where a request to write data to the non-volatile memory 225 has occurred, as described above with reference to FIG. 10. As a result, the CPU 221 is capable of storing the written data in the block of the non-volatile memory 225.

This embodiment has been described taking the non-volatile memory 225 as an example. In FIG. 2, however, even if the memory 223 is connected to the destination of the external bus and access from the CPU 221 can be achieved at high speed, the memory 223 becomes a device in which access from the CPU 201 is slow.

Accordingly, the slow-access device is not limited to a non-volatile memory, as in the above-described embodiment. If the CPU 221 connected to the destination of the external bus is a bus-access-capable device, operation is possible in a manner similar to that of the first embodiment.

In accordance with this embodiment, as described above, a high-performance CPU is capable of shortening access time to a slow-access device connected to a different bus. Further, in a kernel that supports a virtual memory, CPU driving efficiency can be improved while enabling use of a virtual memory.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-037056, filed Feb. 19, 2009, which is hereby incorporated by reference herein in its entirety.

What is claimed is:

1. An information processing apparatus comprising:
a first storage unit configured to store data;

a second storage unit configured to store data;

a first control unit connected to the first storage unit via a first bus, configured to execute an operating system for managing a virtual memory area that includes a first cache area for the second storage unit, and to access the first cache area to acquire the data that has been stored in the second storage unit;

a second control unit connected to the second storage unit via a second bus, configured to communicate with the first control unit; and a generation unit configured to generate specification data, which indicates a corresponding relationship between the first cache area and a second cache area that is provided in the first storage unit for the second storage unit, when the operating system is launched;

wherein the first control unit responds to a request from the second control unit by transferring area information, which is indicative of the second cache area, to the second control unit; and the second control unit transfers the data, which has been stored in the second storage unit, to the second cache area based upon the area information.

2. The apparatus according to claim 1, wherein the specification data includes information for dividing the second cache area into a plurality of blocks and managing the blocks, and the second control unit transfers data block by block.

3. The apparatus according to claim 1, wherein the first control unit starts execution of an application in a case where launch of the operating system has been completed and transfer of data to the second cache area by the second control unit has been completed.

4. The apparatus according to claim 1, wherein the second control unit executes transfer of data to the second cache area attendant upon occurrence of a synchronizing event that synchronizes cache data that has been stored in the first storage unit and data that has been stored in the second storage unit.

5. A method of controlling an information processing apparatus having a first storage unit for storing data; a second storage for storing data; a first control unit connected to the first storage unit via a first bus, for executing an operating system for managing a virtual memory area that includes a first cache area for the second storage unit, and accessing the first cache area to acquire the data that has been stored in the second storage unit; and a second control unit connected to the second storage unit via a second bus, that communicates with the first control unit; the method comprising:

a creation step of creating specification data, which indicates a corresponding relationship between the first cache area and a second cache area that is provided in the first storage unit for the second storage unit, when the operating system is launched;

first transfer step of transferring area information, which is indicative of the second cache area, to the second control unit in response to a request from the second control unit; and a second transfer step of transferring the data, which has been stored in the second storage unit, to the second cache area based upon the area information.

6. The method according to claim 5, wherein the specification data includes information for dividing the second cache area into a plurality of blocks and managing the blocks, and the second transfer step transfers data block by block.

7. The method according to claim 5, wherein the second transfer step executes transfer of data to the second cache area attendant upon occurrence of a synchronizing event that synchronizes cache data that has been stored in the first storage unit and data that has been stored in the second storage unit.

* * * * *